United States Patent [19] [11] 4,412,336
Peltier et al. [45] Oct. 25, 1983

[54] STORAGE COMPARATOR, FOR REGENERATING DIGITAL ELECTRIC SIGNALS AND DIGITAL TRANSMISSION SYSTEM USING SUCH A COMPARATOR

[75] Inventors: Michel Peltier; Maurice Gloanec; Gerard Nuzillat; Vincent Maurel; Michel Charrier, all of Paris, France

[73] Assignee: Thomson-CSF, Paris, France

[21] Appl. No.: 203,380

[22] Filed: Nov. 3, 1980

[30] Foreign Application Priority Data

Nov. 5, 1979 [FR] France ............................ 79 27217

[51] Int. Cl.³ ............................................ H03K 5/153
[52] U.S. Cl. ...................................... 375/4; 307/279; 307/464
[58] Field of Search ................... 178/70 R, 70 TS; 307/448, 453, 464, 468, 469, 350, 354, 362, 481, 238.6, 238.8, 279; 375/4; 365/182

[56] References Cited

U.S. PATENT DOCUMENTS 3,597,626  8/1971  Heightley ......................... 307/464
3,715,603  2/1973  Lerch .............................. 307/464
3,873,775  3/1975  Chown ............................ 375/4
3,986,053 10/1976  Döemer ........................... 375/4
4,031,477  6/1977  Shaw ............................... 307/469
4,227,097 10/1980  Piguet ............................. 307/279
4,242,604 12/1980  Smith .............................. 307/464

OTHER PUBLICATIONS

Electronics Letters, vol. 14, No. 9, Apr. 27, 1978; London, England, pp. 272 to 274.
8th European Microwave Conference 78; Sep. 4-8, 1978, Paris, France: M. Cathelin et al., pp. 55-60.

Primary Examiner—Benedict V. Safourek

[57] ABSTRACT

Device for regenerating digital signals transmitted along a coaxial line.

So as to transmit information at flow rates greater than or equal to 650 Mbauds, the storage comparator of the invention is constructed in the form of an integrated circuit on AsGa and with negative threshold voltage MESFET transistors. It comprises an adjustable threshold voltage comparator stage, a type-D flip-flop for storage and resynchronization with respect to an external clock, and an output matching stage which may provide summation at its output.

5 Claims, 6 Drawing Figures

STORAGE COMPARATOR, FOR REGENERATING DIGITAL ELECTRIC SIGNALS AND DIGITAL TRANSMISSION SYSTEM USING SUCH A COMPARATOR

BACKGROUND OF THE INVENTION

The present invention relates to a storage comparator operating by means of field-effect transistors formed as an integrated circuit principally on gallium arsenide and intended for digital transmission systems.

The digitalization of information and the processing thereof in real time is a technique which finds increasing application in present-day electronic systems. For this reason, the components have to handle larger and larger flows of digital information and the development of numerous systems seems at present conditioned by the availability of components capable of effecting the elementary logic operations in times appreciably less than a nanosecond. Gallium arsenide integrated circuits possess characteristics permitting them to bring an answer to this problem. The technology of negative threshold voltage gallium arsenide field-effect transistor integrated circuits (MESFET) enables the storage comparator of the invention to be constructed with a flow of 900 Megabits/second.

The development of communications entails the development of digital transmission systems whose information flow rates become larger and larger. When the information is to be conveyed over a long distance, the information which is necessarily degraded in the transmission channel must be regenerated. This is why there is disposed, at regular intervals, in the channel a means—the repeater—whose role is precisely to regenerate the electric or optical signal carrying the information. This repeater generally has a circuit which processes electric signals and which is called storage comparator or more rapidly regenerator and whose 3 functions are:
  discrimination of the nature of the symbol present at the input to the generator at a precise time defined by the clock of the system;
  resynchronization of the digital sequence with respect to the clock;
  reshaping of the electric pulses.

In practice, this regenerating circuit operates like a type-D flip-flop having an adjustable voltage threshold for discriminating the nature of the symbol.

The storage comparator of the invention is intended for a high-flow (900 Megabits/second) digital transmission system on a coaxial cable. In such a system, the storage comparator forms the decision means for the regenerating repeater whose role it is to restore the signal degraded during transmission. The storage comparator of the invention processes electric signals.

The storage comparator is a binary component whose essential function is to determine at a so-called sampling time, imposed by an external clock, the electric signal received. In the system considered, digital information at 900 megabits/second is transmitted in the form of a signal with a very wide band, ten octaves or so, coded at three levels written symbolically: +1, 0, −1. The regenerating repeater comprises two storage comparators with staggered thresholds working in parallel, one of the storage comparators comparing the level of the signal received with respect to level +1, the other comparator with respect to the level −1.

Insofar as known storage comparators operating over a coaxial cable at flow rates greater than 90 Megabauds are concerned, the taking into account of the clock signal must be distinguished depending on whether the circuit triggers on a signal edge or whether the circuit functions with a very narrow pulse compared with the duration of the elementary pulse transmitted. This latter technique has been used for different existing systems but it presents the disadvantage of requiring a very narrow clock pulse of a duration less than 100 picoseconds for a flow rate greater than 600 Megabauds, which is not easily achievable especially when the power supply is reduced. It requires moreover the use of diodes such as tunnel diodes or step-recovery diodes whose consumption is fairly high and which do not have an excellent reputation for reliability.

Triggering on a clock pulse leading edge imposes for its part a greater complexity on the regenerator. Discrimination of the nature of the symbol is achieved either by using the non-linearity of the diode, or a differential circuit in structures derived from basic diagrams of the so-called ECL logic, or finally a Schmitt trigger. The active components used in these circuits are bipolar transistors and diodes on silicon or germanium for the earliest system. The highest flow rate known up to date is of the order of 560 Megabauds.

In a transmission system on a coaxial line, it is the regenerator and not the other elements of the repeater, such as filters or amplifiers, which limit to this value the on-line flow rate.

Known circuits formed by bipolar technology on silicon are then at present limited to an on-line flow rate of about 600 Megabauds. To operate with higher flow rates, the circuits formed on gallium arsenide are perfectly adapted since their operating speed is up to six times greater than the operating speed of circuits formed on silicon. This value being the theoretical value which corresponds to the ratio of the mobilities of the electrons in the silicon and in the gallium arsenide.

SUMMARY OF THE INVENTION

The storage comparator of the invention formed according to the so-called negative threshold voltage MESFET technology requires two supply voltages + and −5 volts with respect to ground nominally. It comprises three subassemblies:
  an adjustable threshold voltage comparator whose spectral band taken into consideration for the signal goes from 500 KHz to 500 MHz. The comparator presents in this band a flat gain of the order of 26 decibels for the most sophisticated version;
  a D-type leading-edge triggered flip-flop, controlled by a clock whose maximum frequency is 650 MHz in the system. The information acquisition time, i.e. the sum of the prepositioning and holding times, measured on this band is of the order of 300 picoseconds;
  a low-impedance output interface which switches about 15 milliamps, for amplitude adjustment as well as summation of the output signals of several storage comparators.

More precisely, the invention concerns a storage comparator, ensuring the regeneration of digital electric signals transmitted over coaxial lines, characterized in that it comprises:
  firstly, a field-effect transistor adjustable threshold voltage comparator which compares the input signal (E) applied to a first input terminal with a threshold-adjustment biasing signal ($V_P$) applied to a second input terminal;

secondly, a field-effect transistor type-D leading edge triggered flip-flop which receives at a first input terminal the electric signal from the output terminal of the threshold comparator and resynchronizes it with respect to a clock signal applied to a second input terminal;

thirdly, an output stage formed by a double-gate field-effect transistor which receives on its first gate the signal from the output terminal of the flip-flop, on its second gate a control voltage and delivers at its output terminal an amplitude-matched current at a low impedance.

DESCRIPTION OF THE DRAWINGS

The invention will be better understood from the following description which refers to the figures which show.

DESCRIPTION OF THE PREFERRED EMBODIMENTS

Figure 1:
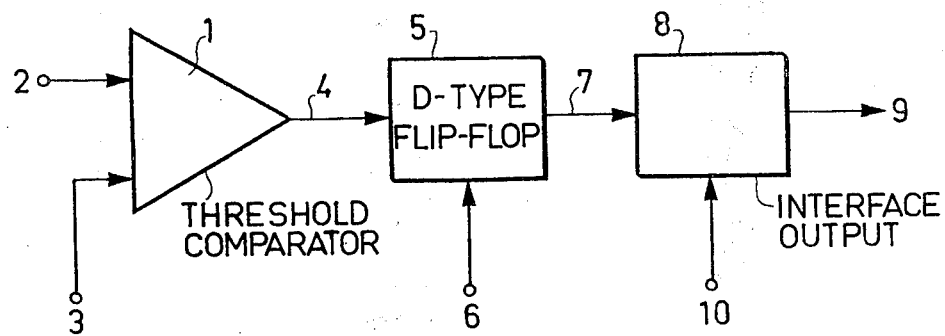
FIG. 1, a simplified diagram of the storage comparator of the invention.

FIG. 1 shows a simplified diagram of the storage comparator of the invention. It comprises a threshold comparator properly speaking 1, one input terminal 2 of which receives the signal to be processed and one input terminal 3 receives a reference signal. The output terminal 4 of the comparator is connected to the flip-flop D5 which receives at a terminal 6 a clock signal. The output terminal 7 of flip-flop D is addressed to a low-impedance output interface 8 which delivers at its output terminal 9 a signal whose level is adjusted by means of terminal 10.

Threshold circuit 1 accomplishes discrimination of the symbol. More precisely, the output of the threshold circuit is in a given logic state (high or low) when the input signal exceeds a given voltage threshold, and in the opposite logic state when the input signal is below this same voltage threshold.

The D5-type flip-flop provides storage of the logic state produced by threshold circuit 1 at the time when the clock signal applied to terminal 6 effects the transition from the high to the low level.

Output interface 8 drives a line in accordance with the international standard of 75 ohms, to effect if necessary the summation with a signal from another regenerator with an output impedance matched to the line and an adequate signal level. It is often necessary to be able to associate two or more regenerators in parallel so as to process a multilevel signal. For example, for a 3-level signal whose states are shown symbolically by $-$, 0 and $+$, a first regenerator whose output is a logic 1 when the input is $+$ and a logic 0 when the input is $-$ or 0 is associated with a second regenerator whose output is logic 1 when the input is 0 or $+$ and logic 0 when the input is $-$. The outputs of the two regenerators must be summated in order to find again a 3-level signal.

Although, in the simplified diagram of the storage comparator of the invention, the type-D flip-flop is borrowed from the known art, the threshold voltage comparator 1 and the output interface 8 constitute original elements. The whole of the storage comparator has been designed and constructed with as objective a low heat dissipation and a low consumption with a view to complete integration for communications equipment. The output interface presents the advantage of accomplishing the function in an extremely simple way which is flexible in use.

Figure 2:
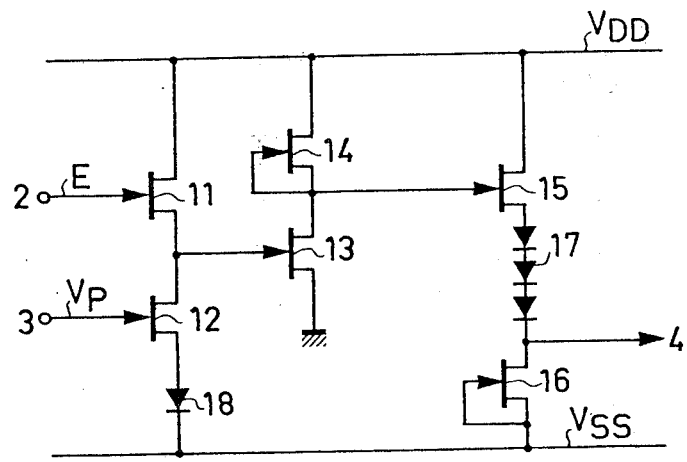
FIG. 2, an electric diagram of the threshold voltage comparator.

FIG. 2 shows the electric diagram of the adjustable threshold voltage comparator 1 shown by a block diagram 1 in FIG. 1.

This comparator comprises three series-mounted stages formed respectively by field-effect transistors 11 and 12, for the first stage, 13 and 14 for the second stage, 15 and 16 for the third stage. These are field-effect transistors of the type with a negative threshold voltage between $-1$ volt and $-2.5$ volts. Furthermore, two voltages supply the circuit: a positive voltage VDD typically between $+4$ and $+7$ volts, and a negative voltage VSS between $-3$ and $-6$ volts.

The second stage formed of field-effect transistors 13 and 14 is a so-called common-source circuit, transistor 14 being an active load for transistor 13. This stage has a voltage gain which is maximum when the gate voltage of transistor 13 is zero, provided that the 2 field-effect transistors are identical. This is a consequence of the symmetry of the stage.

This stage has a non-linear transfer coefficient whose threshold is fixed and is equivalent to zero. To obtain an adjustable threshold, it is sufficient to voltage shift the signal on the grid of transistor 13, with respect to the input signal E applied to terminal 2, by a suitable value. This is precisely the function of the first stage formed of transistors 11 and 12 which constitute a common drain type circuit whose current source 12 is adjustable by means of the DC voltage $V_P$ applied to terminal 3. If $V_S(t_{11})$ is the source voltage of field-effect transistor 11 and if field-effect transistors 11 and 12 are identical we then have equality $V_S(t_{11}) = E + V_{SS} - V_P$ since transistors 11 and 12 deliver the same current. Consequently, $V_S(t_{11})$ is equal to the signal E applied to the input terminal 2 shifted by an externally fixed DC voltage $V_{SS} - V_P$. With a voltage threshold $E_S$ given, $V_P$ must be adjusted to the value $E_S + V_{SS}$ so that the circuit compares the input signal E with the value $E_S$.

The last stage formed by transistor 15 mounted in series with transistor 16 through one or more diodes 18, effects a voltage shift so as to ensure compatibility with the logic states of flip-flop 5 which follows the voltage comparator and also an impedance matching. The number of shift diodes 18 depends on the threshold voltage of the field-effect transistors and on supply voltages. This third stage is driven on the grid of transistor 15 by the output signal from the second stage and it delivers at terminal 4 an electric signal applied to flip-flop D5. By taking into account the nature of the field-effect transistors it is possible to vary $V_P$ between values $V_{SS} + V_T$ and $V_{SS} + V_B$ where $V_T$ is the negative threshold voltage of the field-effect transistor 12 and $V_B$ the diffusion potential, consequently $E_S$ may vary between $V_T$ and $V_B$ with respect to ground. In order to avoid the disadvantage where $V_P$ is less than $V_{SS}$ for a negative threshold, the diagram is completed by inserting a diode 18 between transistor 12 and supply $V_{SS}$: the role of this diode is to ensure a greater stability of the threshold. Thus, transistor 12 may have a negative gate-source voltage without $V_P$ being less than $V_{SS}$.

Figure 3:
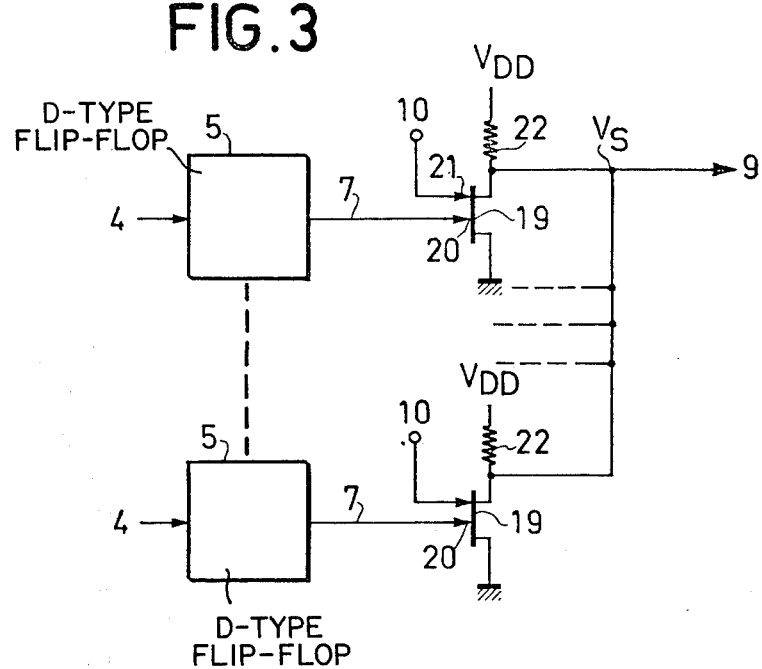
FIG. 3, an electric diagram of the output interface.

FIG. 3 shows the electric diagram of the output interface. This output interface shown by block 8 in FIG. 1 is essentially formed by a double-gate field-effect transistor 19 common-source mounted with a resistive load 22 supplied with voltage $V_{DD}$. The advantage of the double-gate field-effect transistor lies in the fact that it allows the level of the output signal at terminal 9 to be controlled easily by applying, through terminal 10, an adequate DC voltage to the second gate 21, the first gate, receiving the signal from the type D5 flip-flop. This output stage has several functions: to protect the information, to control the level thereof, to ensure the voltage summing of the signals from several regenerators simply by connecting their output point and finally to match the impedance.

If n channels are to be summated at their output on a line whose impedance measured at terminal 9 is equal to $Z_C$, the load resistance 22 of each field-effect transistor, i.e. of each of the outputs of the n channels, is chosen equal to $nZ_C$ so as to have as output impedance $Z_C$. The summation results from the fact that a common-source field-effect transistor may be considered in the first analysis as a current source J which depends directly on the voltage at the first grid VG: when the output voltage VS is in state 0, J is at its maximum value J max and when $V_G$ is in the low state, J=0. Since the output voltage $V_S$ is equivalent to: $V_{DD}-Z_C(J_1+J_2+\ldots J_n)$ where $J_1, \ldots J_n$ are drain currents of different channels numbered from 1 to n, there is indeed summation of the signals.

Figure 4:
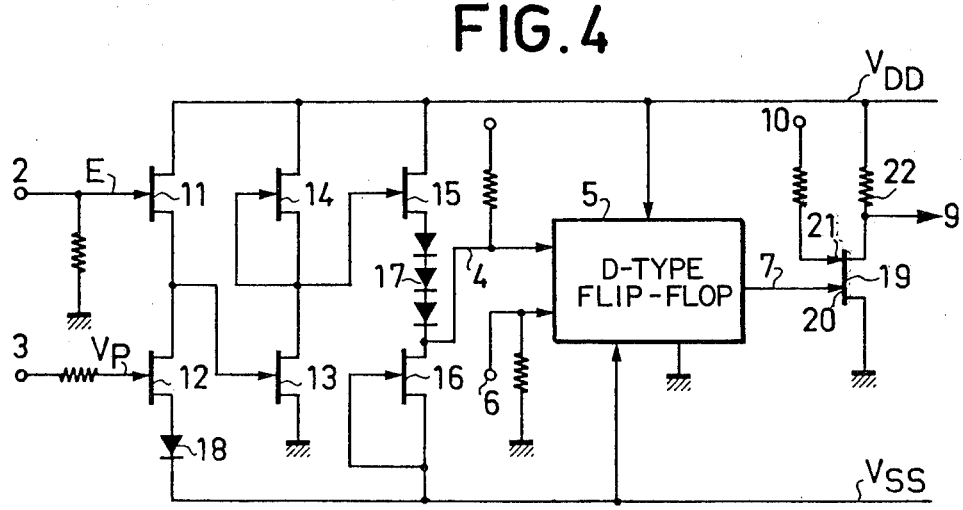
FIG. 4, the electric diagram of the complete storage comparator of the invention.

FIG. 4 represents the electrical diagram of the complete storage comparator of which FIG. 1 is the simplified block diagram.

By comparison with FIG. 1, comparator 1 is formed by the first stage comprising the field-effect transistors from 11 to 16 associated with diodes 17 and 18, whose signal input is at terminal 2, the input for the reference signal at terminal 3 and the output signal available at terminal 4. Flip-flop D5 delivers at its output terminal 7 a signal applied to the output interface stage formed by transistor 19. The output signal is available at terminal 9. Compared with FIGS. 2 and 3, a number of resistors are shown in FIG. 4. These are resistors connected to the gate of transistor 11, the grid of transistor 12 and to the two input terminals 4 and 6 of flip flop D5. All the resistors of the diagram apart from the load resistance 22 are resistors for protecting the field-effect transistors.

Figure 5:
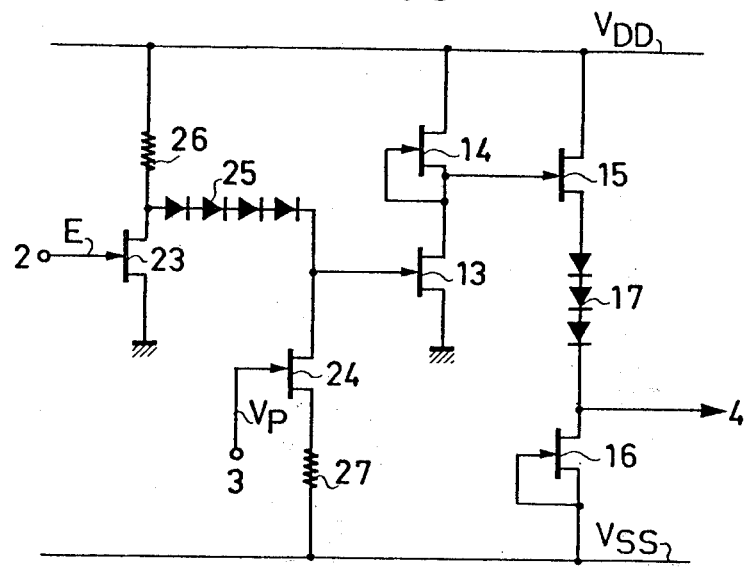
FIG. 5, the diagram of a first variation of the threshold voltage comparator.

FIG. 5 shows the electric diagram of a first improvement to the threshold comparator circuit, circuit 1 of FIG. 1.

It is clear from this diagram that the second stage formed by transistors 13 and 14 and the third stage formed by transistors 15, 16 and the diodes 17 of this threshold comparator remain identical to those which were shown with reference to FIG. 2. The first stage is modified thus: the input signal available at terminal 2 is applied to the gate of a field-effect transistor 23 mounted as a common source between supply $V_{DD}$ and ground through a resistor 26 connected to the source of the transistor. This transistor 23 amplifies the signal which is taken through a series of diodes 25 and applied to the source of a field-effect transistor 24 whose drain is connected to voltage $V_{SS}$ through a resistor 27. The bias of shift voltage available at terminal 3 is applied to the gate of this second transistor 24. The output of this first stage is taken from the source of transistor 24 and applied to the gate of transistor 13 of the second stage. The first stage formed by transistors 23 and 24 of this comparator thus improved is then a resistive-load common-source circuit which ensures the gain function in which there is injected a current controlled by the shift voltage $V_P$ which ensures the shift function. The operating point of transistor 23 is thus adjusted and then shifted suitably by diodes 25 which allows it to operate about the internal threshold of the second stage, i.e. transistors 13 and 14.

Figure 6:
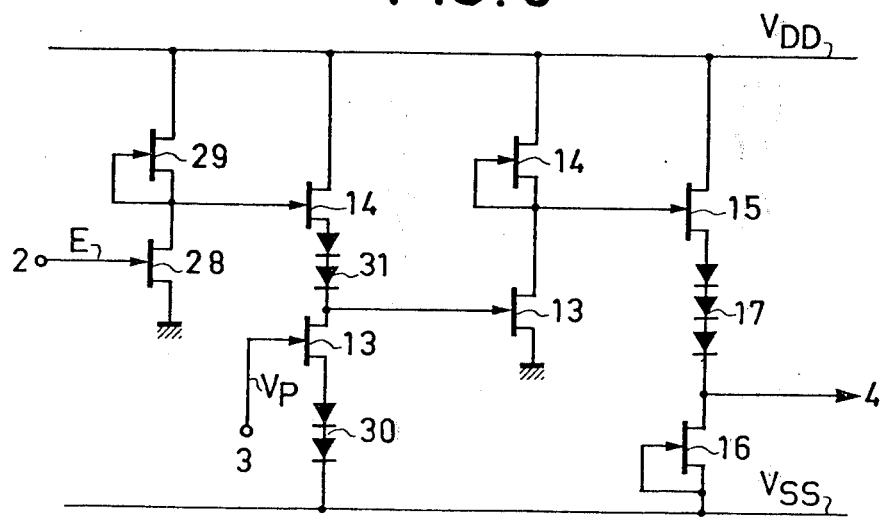
FIG. 6, the diagram of a second variation of the threshold voltage comparator.

FIG. 6 shows the electric diagram of the threshold comparator according to a second improvement. The output stages formed by transistors 13, 14, 15, 16 and diodes 17 are common with the basic diagram of the threshold comparator described with reference to FIG. 2 and the threshold comparator according to a first improvement described above.

However, this third threshold comparator embodiment comprises an additional stage formed by transistors 28 and 29 and diodes 30 and 31 inserted in the first stage between transistors 13 and 14 and the supply source $V_{SS}$ of transistor 13. The stage with transistors 28 and 29 is a common-source circuit stage in which the high-gain zone is situated about point E=0 because transistors 28 and 29 are identical. The signal E is applied to the gate at terminal 2 of transistor 28. The threshold-adjustment stage formed by transistors 13 and 14 comprises several additional diodes—4 being a preferred number—so as to ensure the voltage shift and the suitable threshold adjustment latitude.

This third threshold comparator embodiment is more interesting than the second embodiment. In fact, it presents less voltage drifts because all the transistors are identical and the voltage levels are independent of the current levels.

It is noteworthy that the threshold comparator indeed requires negative threshold voltage field-effect transistors and could not be transposed into a bipolar transistor circuit for example. Furthermore, it requires transistor matching, which can be practically only achieved with integrated circuits. The advantage of integration is a determining factor a part from other advantages since the voltage threshold is fixed in a first approximation only by external voltages and is insensitive to variations in the characteristics of the active layer of the semiconductor or of the currents flowing in the circuit. This is important since the threshold must be as stable as possible.

The most important characteristics of the technology for constructing the storage comparator of the invention are the following: epitaxy in the vapor phase on a buffer layer, field-effect transistor gate made from titanium, platinum, gold, dual interconnection level, integration of metal matching and protection resistors.

The performances of the storage comparator of the invention have been measured.

For the threshold comparator, a maximum gain of the order of 10 dB for a passband of 1.5 Gigahertz was obtained with the threshold comparator having the first improvements. The version of the threshold comparator having the second improvement presents a higher gain of 25 dB and a slightly reduced passband of 900 Megahertz.

The power dissipated in the threshold comparator is less than 90 milliwatts for supply voltages VDD=+5.5 volts and VSS=−5.5 volts.

The propagation times are between 130 picoseconds and 300 picoseconds and differ little according as to whether the input signal is of a small or large amplitude; this characteristic is important from the point of view of the system in which the storage comparator is used, a system in which a small delay is desirable and especially not very dependent on the pulse shapes.

The D-type flip-flop was characterized by measuring the maximum division-by-2 frequency when the inverted output is relooped to the input of the circuit. The value obtained was 1.6 gigahertz for a dissipated power of the order of 450 milliwatts, which is largely sufficient for regenerating at flow rates at least equal to 1 gigabaud.

The transition times for the output signal, measured from 20 to 80%, were at best 160 picoseconds for the rise time and 100 picoseconds for the releasing time.

The time for acquiring the information which may be defined as the minimum duration of the signal at the input which triggers the flip-flop without fail, is less than or equal to 350 picoseconds.

For the complete regenerator, the maximum operating clock frequency is above 1 gigahertz. The rise and release times for the output pulse measured from 20% to 80% are of the order of 200 picoseconds.

One important merit for this type of circuit is the sensitivity defined as the minimum amplitude of the noiseless input signal such that the regenerator triggers correctly. The sensitivity increase when the frequency increases: it is less than 10 millivolts, at 50 Megahertz and reaches 100 millivolts at 650 Megahertz with the threshold comparator according to the first improvement and 34 millivolts at 650 Megahertz with the threshold comparator comprising the second improvements. The power dissipated varies appreciably with the technological construction parameters: it is between 200 and 500 milliwatts.

It is important to notice that the operating limit frequency of this component which is at present greater than 1 gigahertz should not be considered as indicative of the performance limits of the technology used for its construction, i.e. the technology of integrated circuits on negative threshold voltage gallium arsenide. In fact, the optimization of the consumption related to the application contemplated in telecommunication systems has led to searching for a compromise between the speed and the consumption rather than in giving the privilege to dynamic performance. Apart from this restriction and with the same implantation rules a maximum operating frequency close to 2 gigahertz can be attained in this technology.

The storage comparator formed as a field-effect transistor integrated circuit on gallium arsenide in accordance with the invention has been designed for the needs of a system for digital transmission on coaxial cable, but its use may extend to other digital transmission systems such as microwave links, optical fibres, etc. with the only condition that the sensor interfaces are matched.

It is also useful in automatic-control instruments where rapid processing of the signal is required, for example in an analog digital converter.

What is claimed is:

1. A storage comparator, providing regeneration of digital electric signals transmitted over coaxial lines, comprising: a D-type field effect transistor flip-flop triggered on leading edges, said comparator further comprising:
    an input stage having a FET adjustable threshold voltage comparator, which receives a signal on a first input terminal and a polarization signal on a second input terminal, said polarization signal allowing a choice of the threshold for the signal at the input of the D-type flip-flop, and at least one diode locating said threshold near the FET's threshold, in said input stage; and
    an output stage, formed by a double-gate FET, which receives at a first gate thereof the signals from the output terminal of the flip-flop, and at a second gate thereof a control voltage for the impedance adjustment of the output signal.

2. The storage comparator as claimed in claim 1, wherein the threshold voltage comparator comprises:
    a first voltage-shift stage which comprises two identical field-effect transistors, mounted with "common drain," in series with diodes whose number is between 1 and 4, and in which a shift voltage applied to a terminal connected to the gate of one transistor shifts a voltage applied to the gate of the other transistor;
    a second high-voltage-gain stage which comprises two identical field-effect transistors, mounted with common source, which receives at the gate of one transistor the output signal from the first stage, taken between the first two transistors;
    a third stage, of the follower type, which comprises two identical field-effect transistors between which are placed shift diodes whose number is between 1 and 4, said third stage receiving at the gate of one of its transistors the high-impedance signal taken from between the two transistors of the second stage and delivering at its output terminal an impedance-matched signal compatible with the logic levels of the flip-flop.

3. The storage comparator as claimed in claim 1, wherein the output stage is formed by a field-effect transistor loaded by a resistor whose value is equal to "n" times the impedance of the output line, which allows the summation of "n" storage comparators, connected in parallel, to be effected on a single output line.

4. The storage comparator as claimed in claim 2, wherein the first stage of the threshold voltage comparator comprises a first common-source-connected field-effect transistor, with a resistive load, which receives at its gate an input voltage and a second field-effect transistor, with resistive load, which receives at its gate a bias voltage, the output voltage from this first stage being shifted by diodes whose number is between 1 and 4.

5. The storage comparator as claimed in claim 2, wherein the first stage of the threshold comparator is preceded by a stage for amplifying small signals, comprising two identical common-source-mounted field-effect transistors, which receives at the gate of one transistor an input voltage E and delivers an amplified signal taken from between the two transistors.

* * * * *